(12) United States Patent
Fish et al.

(10) Patent No.: US 12,438,812 B2
(45) Date of Patent: Oct. 7, 2025

(54) EDGE SYNCHRONIZATION PLATFORM

(71) Applicant: DittoLive Incorporated, San Francisco, CA (US)

(72) Inventors: Adam Brandon John Fish, Berkeley, CA (US); Thomas Karpiniec, Tasmania (AU); Connor Maurice Power, Marlborough (NZ)

(73) Assignee: Dittolive Incorporated, San Francisco, CA (US)

( * ) Notice: Subject to any disclaimer, the term of this patent is extended or adjusted under 35 U.S.C. 154(b) by 0 days.

(21) Appl. No.: 18/630,677

(22) Filed: Apr. 9, 2024

(65) Prior Publication Data

US 2024/0259310 A1 Aug. 1, 2024

Related U.S. Application Data

(63) Continuation of application No. 18/238,083, filed on Aug. 25, 2023, now Pat. No. 11,962,503.

(60) Provisional application No. 63/482,273, filed on Jan. 30, 2023.

(51) Int. Cl.
*H04L 45/745* (2022.01)
*H04L 1/18* (2023.01)

(52) U.S. Cl.
CPC ............ *H04L 45/745* (2013.01); *H04L 1/18* (2013.01)

(58) Field of Classification Search
CPC ....... H04L 45/745; H04L 1/18; H04L 1/1825; H04L 2001/0093; H04L 2001/0097
See application file for complete search history.

(56) References Cited

U.S. PATENT DOCUMENTS

| | | | |
|---|---|---|---|
| 11,108,862 B2 | 8/2021 | Kistner | |
| 11,593,098 B2 | 2/2023 | Vincent et al. | |
| 2016/0149760 A1* | 5/2016 | Voit | H04L 41/0894 709/221 |
| 2016/0359811 A1 | 12/2016 | Chan et al. | |
| 2018/0014340 A1 | 1/2018 | Hill et al. | |
| 2019/0289656 A1* | 9/2019 | Valicherla | H04L 63/0272 |
| 2020/0374953 A1* | 11/2020 | Majmundar | H04L 5/0092 |
| 2021/0126986 A1 | 4/2021 | Rolf et al. | |
| 2022/0141190 A1 | 5/2022 | Olson et al. | |
| 2023/0247006 A1 | 8/2023 | Pemmaraju et al. | |
| 2024/0022411 A1* | 1/2024 | Moore | H04L 9/50 |
| 2024/0121297 A1* | 4/2024 | Vaddadi | H04L 67/1059 |

FOREIGN PATENT DOCUMENTS

WO 2022/096137 A1 5/2022

OTHER PUBLICATIONS

International Search Report and Written Opinion received for PCT Patent Application No. PCT/US23/80740, mailed on Jan. 25, 2024, 11 pages.

* cited by examiner

*Primary Examiner* — Donald L Mills
(74) *Attorney, Agent, or Firm* — Workman Nydegger

(57) ABSTRACT

An edge synchronization platform that facilitates mesh network routing via dynamic routing tables is disclosed. A node in the mesh network obtains a network communication. The node performs a wrapping operation on the network communication to generate a wrapped data packet. The wrapped data packet includes a destination indicator. The node identifies a recipient node for the wrapped data packet using a dynamic routing table. The node then sends the wrapped data packet to the recipient node.

18 Claims, 18 Drawing Sheets

400

402 — Receiving A Wrapped Data Packet From An Other Node Within The Mesh Network, The Wrapped Data Packet Being Generated Based Upon A Network Communication, The Wrapped Data Packet Comprising A Destination Indicator

404 — Based At Least Upon The Destination Indicator, Determining A Recipient Node For The Wrapped Data Packet Within The Mesh Network Of Nodes Using A Dynamic Routing Table

406 — In Response To Determining That The Recipient Node Comprises The Particular Node, Performing An Unwrapping Operation To Facilitate Processing Of The Network Communication

FIG. 4

EDGE SYNCHRONIZATION PLATFORM

CROSS-REFERENCE TO RELATED APPLICATIONS

This application is a continuation of U.S. patent application Ser. No. 18/238,083 filed on Aug. 25, 2023, entitled "EDGE SYNCHRONIZATION PLATFORM," which claims the benefit of and priority to U.S. Provisional Patent Application Ser. No. 63/482,273 filed on Jan. 30, 2023, and entitled "MESH NETWORK ROUTING VIA DYNAMIC ROUTING TABLES," which applications are expressly incorporated herein by reference in their entirety.

BACKGROUND

Many individuals and enterprises use virtual private networks (VPNs) to enable devices to securely connect to public or enterprise-specific information, applications, and tools. For instance, an enterprise may cause certain content, such as content obtained from a service via a web application programming interface (API), to be accessible to devices connected to a VPN. In doing so, the enterprise can render that content inaccessible to other devices on the public network.

To connect to a VPN, a client device typically establishes a connection to a VPN server. The server then provides VPN tunneling functionality for packets transmitted between the device and other servers. To connect to a VPN server, typical VPN applications require the device to be directly connected to a wide area network (WAN), typically by a Wi-Fi, cellular, satellite, or cable connection between the device and communication systems of an internet service provider. Conventional VPN services can cause devices that lose direct WAN connectivity to lose VPN functionality. This can be disruptive to the operations of enterprises and individuals.

Many enterprises implement devices that are operated by employees who move about during use. As various examples, employees using a device can move in factory settings, airplanes, cruise ships, mining operations, and so on. These user devices may intermittently lose WAN connectivity in certain areas, which can be disruptive to VPN-reliant operations performed by such devices.

The subject matter claimed herein is not limited to embodiments that solve any challenges or that operate only in environments such as those described above. Rather, this background is only provided to illustrate one exemplary technology area where some embodiments described herein may be practiced.

BRIEF SUMMARY

In some aspects, the techniques described herein relate to a system that operates in a mesh network of nodes, said system being one node in the mesh network, said system facilitating an edge synchronization platform and including: one or more processors and one or more hardware storage devices that store instructions that are executable by the one or more processors to cause the system to: access a network communication; perform a wrapping operation on the network communication, wherein performing the wrapping operation results in generation of a wrapped data packet, and wherein the wrapped data packet includes a destination indicator; determine, based on the destination indicator, a recipient node for the wrapped data packet, wherein the recipient node is included in the mesh network, and wherein determining the recipient node is performed using a dynamic routing table; and send the wrapped data packet to the recipient node.

In some aspects, the techniques described herein relate to a node in a mesh network of nodes, said including: one or more processors and one or more hardware storage devices that store instructions that are executable by the one or more processors to cause the node to: receive a wrapped data packet from another node included in the mesh network, the wrapped data packet being generated based on a network communication, the wrapped data packet including a destination indicator; determine, based on the destination indicator, a recipient node for the wrapped data packet, wherein the recipient node is also included in the mesh network, and wherein determining the recipient node is performed using a dynamic routing table; and send the wrapped data packet to the recipient node.

In some aspects, the techniques described herein relate to a method for transmitting data through a mesh network of nodes, said method being performed by a node in the mesh network, said node facilitating an edge synchronization platform, said method including: receiving a wrapped data packet from another node in the mesh network, the wrapped data packet being generated based on a network communication, the wrapped data packet including a destination indicator; determining, based on the destination indicator, a recipient node for the wrapped data packet, wherein: the recipient node is also included in the mesh network, said determination is performed using a dynamic routing table, the dynamic routing table includes a conflict-free replicated data type, and each node in the mesh network maintains a corresponding replica of the dynamic routing table; and in response to determining that the recipient node is said node, performing an unwrapping operation on the wrapped data packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 2, 3, and 4 illustrate example flow diagrams depicting acts associated with mesh network routing via dynamic routing tables.

DETAILED DESCRIPTION

Figure 1A:
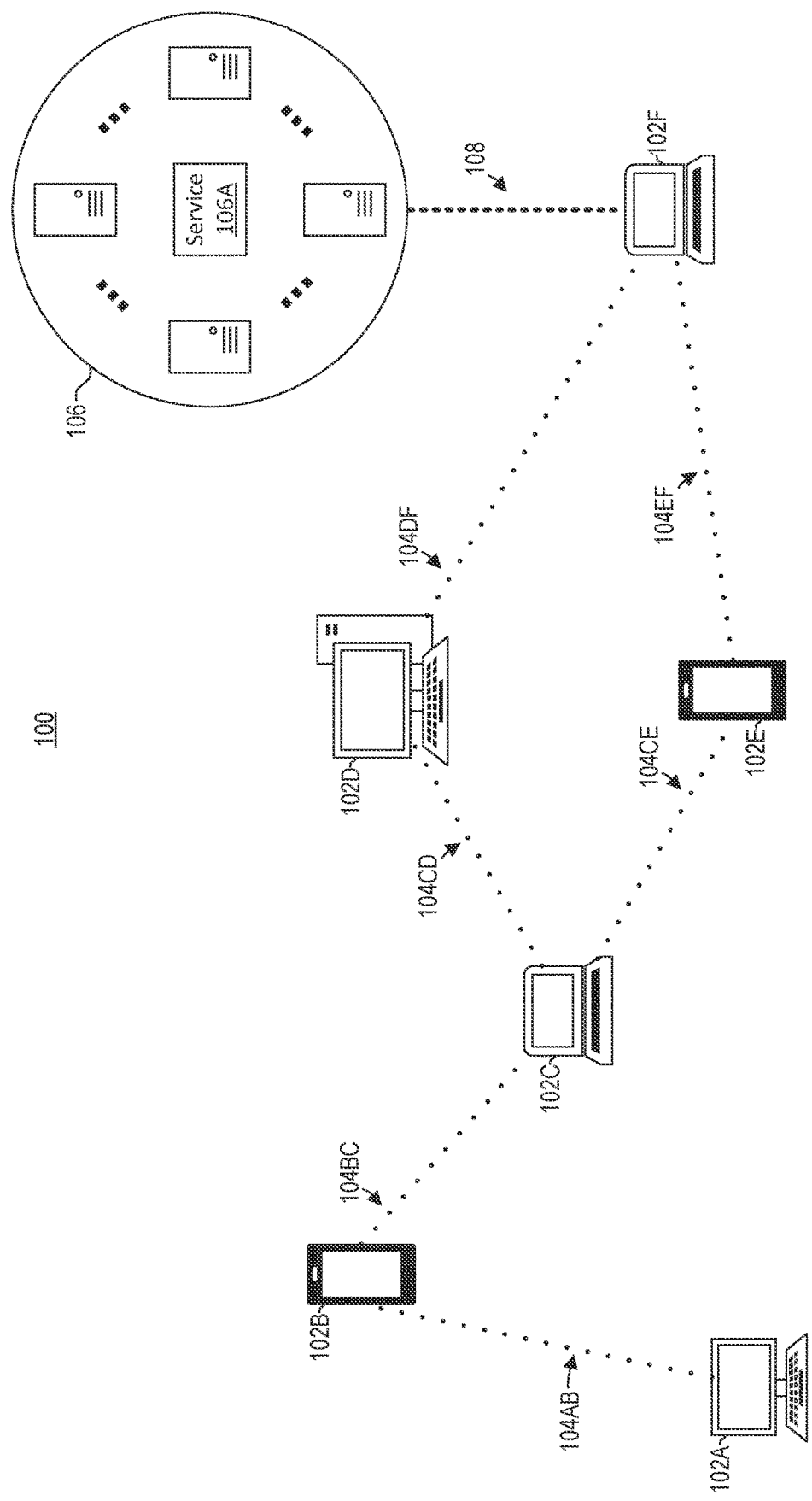
FIG. 1A illustrates a conceptual representation of an example mesh network of nodes that are interconnected by peer-to-peer connections.

Typical VPN applications require a device to be directly connected to a WAN, often by way of a Wi-Fi, cellular, satellite, or cable connection between the device and communication systems of an internet service provider. Such limitations of conventional VPN services can cause devices that lose direct WAN connectivity to lose VPN functionality, which can be disruptive or limiting to the operations of enterprises and individuals.

The disclosed embodiments are directed to various improvements, benefits and practical applications of an edge synchronization platform, which enables devices located at the edge of a network to synchronize data with one another, even if one or more of those devices are not directly connected to a wide area network. Using the disclosed edge synchronization platform, the embodiments are able to route content via various dynamic routing tables to ensure synchronization between devices located at the edge of a network. Beneficially, the disclosed embodiments facilitate mesh network routing via dynamic routing tables in order to mitigate the disruptive events described above. By implementing the disclosed principles, the embodiments are able to improve a user's experience when interacting with the mesh network. Furthermore, the embodiments are able to improve the functionality of a computer system/device by enabling that system to have continuous, or near continuous, connection to the mesh network.

As another benefit, at least some of the disclosed techniques may be implemented in a mesh network of nodes in which nodes are interconnected via personal or local connections. Examples of such connections include, but are not limited to, peer-to-peer Wi-Fi, Bluetooth, Zigbee, internet of things (IoT) connections, or others.

As yet another benefit, each node can maintain a replica of a dynamic routing table; further, each node can publicize changes to the dynamic routing table or can update states for the dynamic routing table. Doing so allows the other nodes in the mesh network to facilitate convergence and consistency of the dynamic routing table replicas.

Beneficially, the dynamic routing table may be concurrently updated by multiple nodes, enabling the nodes of the mesh network to achieve consensus on a routing table for the mesh network even in highly dynamic contexts, such as when devices are regularly added to or removed from the mesh network. Optionally, the dynamic routing table may be maintained at the various nodes of a mesh network as a conflict-free replicated data type (CRDT). Generally, a CRDT refers to a type of data structure that can be replicated on multiple different devices. CRDTs have a number of specific features. One feature is that an application has the ability to replicate simultaneously and independently relative to other applications and without coordination. Another feature is that inconsistencies can be automatically resolved. Yet another feature is that convergence between replicas will occur eventually.

Using the dynamic routing table, the nodes of a mesh network can beneficially facilitate both packet creation and packet routing tasks such that, when at least one node within a mesh network has a direct WAN connection, the nodes can route packets to and from the WAN-connected node(s). Doing so effectively extends the WAN connectivity to all of the nodes within the mesh network, even those nodes that are not directly connected to the WAN.

As another benefit, the disclosed techniques can enable nodes in a mesh network to establish their own routing by creating an overlay network amongst themselves via personal or local connections. In the example of VPN functionality, nodes within a mesh network can act as both VPN clients and routers, such as by bridging encrypted packets, to enable devices that are not WAN connected to reach a VPN endpoint. Such functionality is particularly advantageous in contexts where devices that rely on secure backend infrastructure regularly move into and out of WAN connectivity (or remain out of WAN connectivity) but remain within connection proximity to a network of devices where at least one device maintains WAN connectivity.

Many of the examples described herein focus on utilizing the disclosed dynamic routing table techniques to facilitate extension of VPN functionality to devices that are not directly connected to a WAN. It should be noted, however, how the disclosed techniques may be implemented for other purposes as well. As some examples, the disclosed techniques can be used to facilitate peer-to-peer communications within a mesh network. The techniques can also be used to facilitate routing or translation of public network requests, such as for accessing the public internet. Indeed, the disclosed principles can be implemented in numerous scenarios. Thus, the examples provided herein should be viewed as being non-limiting in nature. Accordingly, these and numerous other benefits will now be described in more detail throughout the remaining sections of this disclosure.

Example Mesh Networks

Attention will now be directed to FIG. 1A, which illustrates an example mesh network 100 that includes various nodes, such as nodes 102A, 102B, 102C, 102D, 102E, and 102F. Mesh network 100 facilitates a so-called "edge synchronization platform." As used herein, the phrase "edge synchronization platform" generally refers to an architecture that enables edge devices to synchronize data with one another, even when one or more of those edge devices may not be directly connected to a wide area network (e.g., the Internet). This edge synchronization platform may be configured in some embodiments to route data using dynamic routing tables. As also used herein, a "node" (aka a "peer") refers to any type of computing entity that is connected to mesh network 100. To be a node, a node will include a client application that enables the node to join the mesh network 100 and to provide various other features and functionalities, such as pushing data to a service in the cloud and receiving data or commands from the service. The client application may incorporate a software development kit that facilitates such features and functionalities.

Mesh network 100 may include any number of nodes that are interconnected by peer-to-peer connections. FIG. 1A depicts connection 104AB between nodes 102A and 102B, connection 104BC between nodes 102B and 102C, connection 104CD between nodes 102C and 102D, connection 104CE between nodes 102C and 102E, connection 104DF between nodes 102D and 102F, and connection 104EF between nodes 102E and 102F. The various peer-to-peer connections between the nodes of mesh network 100 may take on various forms, such as peer-to-peer Wi-Fi connections, Bluetooth connections, Zigbee connections, wired connections, IoT connections, and/or others.

In the example of FIG. 1A, at least one of the nodes of mesh network 100 is directly connected to a WAN 106 (e.g., the cloud). In particular, node 102F is directly connected to WAN 106 via a direct WAN connection 108. Direct WAN connection 108 may comprise a communication channel between node 102F and the communication systems of an internet service provider. For instance, via the direct WAN connection 108 to the WAN 106, node 102F can access various servers (e.g., VPN servers) for various purposes (e.g., VPN functionality).

As used herein, the term "direct" should be viewed as referring to a scenario where a first device/peer is connected to a second device/peer, and there is no proxy or intermediate peers between the first and second peers. With reference to FIG. 1A, node 102F can be considered a first peer and a service 106A in WAN 106 can be considered a second peer. Notice, there is no intermediary peer between node 102F and the WAN 106.

It may be the case, however, that there are other intervening computing nodes or devices that exist between node 102F and service 106A. For instance, any number of routers, switches, gateways, eNodeBs, or other computing entities may exist between node 102F and service 106A, and these other computing entities are used to facilitate communications between service 106A and node 102F. Two peers can still be considered as being "directly" connected to one another even if other, non-peer devices are logically disposed between those two peers.

For instance, node 102F may be using a telecommunications network (e.g., perhaps a 3G network, 4G network, 5G network, etc.) to communicate with service 106S. That telecommunications network includes a base station, a controller, and a core network. Node 102F may communicate with service 106A via the base station, the controller, and the core network, yet node 102F is still considered to have a "direct" connection to service 106A because those intervening computing elements do not include the client application used to create the mesh network and thus are not peers. More particularly, those intervening computing entities do not have the client application; thus, a scenario in which one node is "directly" connected to another node/peer refers to a scenario where there are no intervening nodes/peers, though there may be other intervening, non-peer computing entities.

As another example, node 102B is an intermediary node between nodes 102A and 102C. Similarly, node 102C is an intermediary peer between nodes 102B and 102E.

There are a variety of reasons why an intermediary node may exist between two other nodes. For instance, one node may be a type of device that includes functionality for using a telecommunications broadband network to connect to WAN 106. Another node, which may perhaps be an IoT device, may not have a similar kind of functionality; instead, the IoT node may be configured to include only a local area network (LAN) connection, a Bluetooth connection, or any other near field connection. Stated differently, it may be the case that IoT device does not include the ability to connect to WAN 106 and thus relies on another node to enable a connection to WAN 106.

In FIG. 1A, mesh network 100 includes various nodes that are not directly connected to WAN 106. To illustrate, nodes 102A, 102B, 102C, 102D, and 102E are not directly connected to the WAN 106. A mesh network 100 may include any number of nodes that are directly connected to a WAN 106 and any number of nodes that are not directly connected to a WAN 106.

As will be described in more detail below, the nodes of mesh network 100 may facilitate their own routing to effectively extend direct WAN connectivity to all nodes within mesh network 100. Such operations can be performed via the use of a dynamic routing table.

Figure 1B:
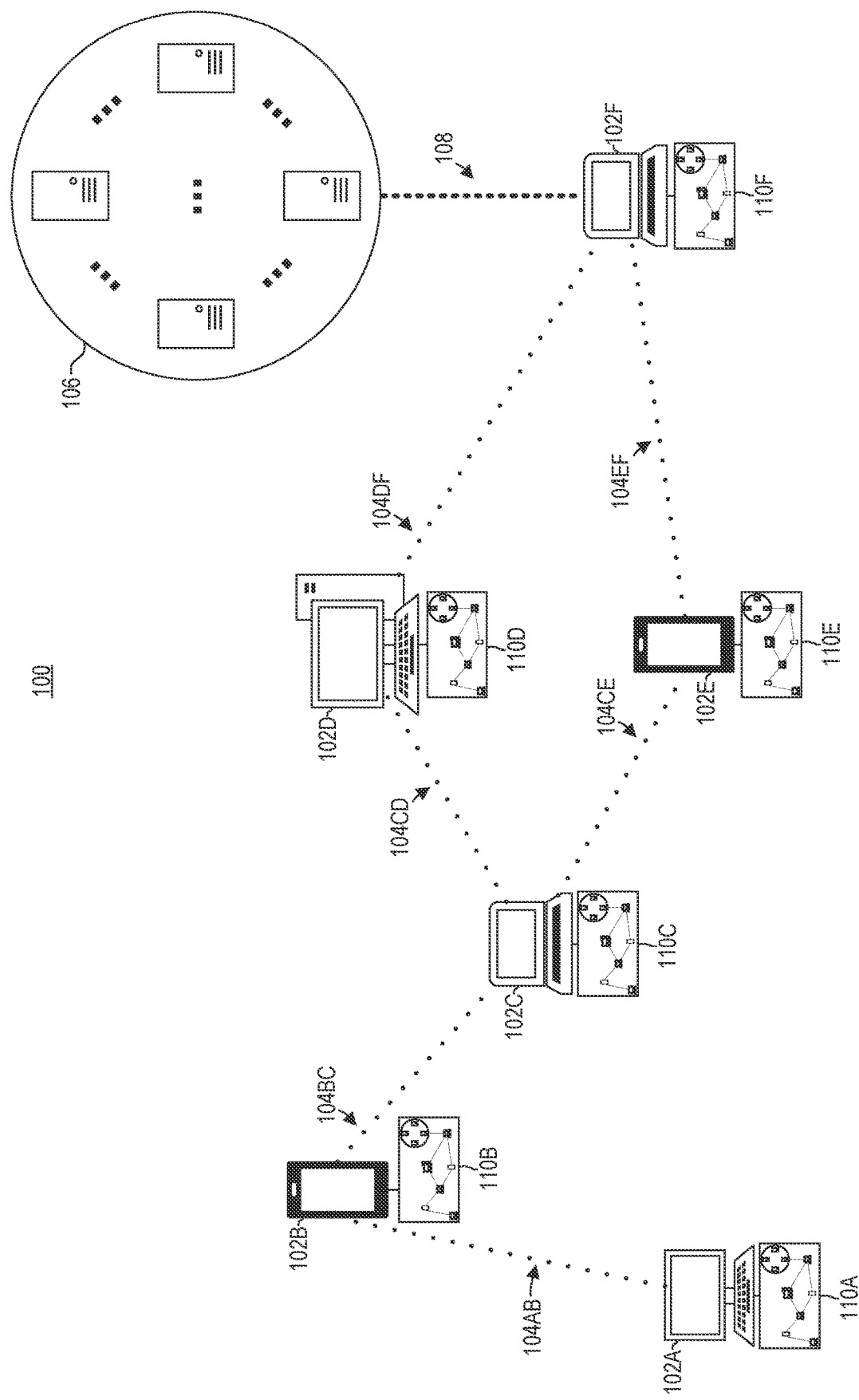
FIGS. 1B and 1C illustrate a conceptual representation of dynamic routing table replicas maintained by the nodes of the mesh network of nodes.

FIG. 1B illustrates a conceptual representation of a dynamic routing table maintained by the nodes of mesh network 100. The dynamic routing table may store topological information about mesh network 100 to provide an information base of routes to destinations within mesh network 100. The dynamic routing table can further store information about other metrics, such as distances and routing information. As another example, the dynamic routing table may include paths to destinations and/or next hop associations indicating the next node to which to push a data packet to in order to transmit the data packet to its final destination.

In some implementations, the dynamic routing table is implemented as a CRDT that is replicated across the nodes of mesh network 100. FIG. 1B illustrates dynamic routing table replicas 110A, 110B, 110C, 110D, 110E, and 110F associated with nodes 102A, 102B, 102C, 102D, 102E, and 102F, respectively.

Implementing the dynamic routing table as a CRDT provides several benefits. For example, these benefits include the ability to enable independent, concurrent updating to the replicas of the dynamic routing table without coordination among the nodes. The benefits further include automatic inconsistency resolution and guaranteed convergence over time, even though replicas may have different states at certain points in time.

As an example, consider a scenario where node 102A is newly added to mesh network 100. To be added to mesh network 100, node 102A may obtain a dynamic routing table replica 110A and add itself to the dynamic routing table replica 110A. This update to the dynamic table replica may be communicated to the other nodes 102B, 102C, 102D, 102E, and 102F of mesh network 100 to enable those other nodes to update their respective replicas of the dynamic routing table in due course.

Figure 1C:
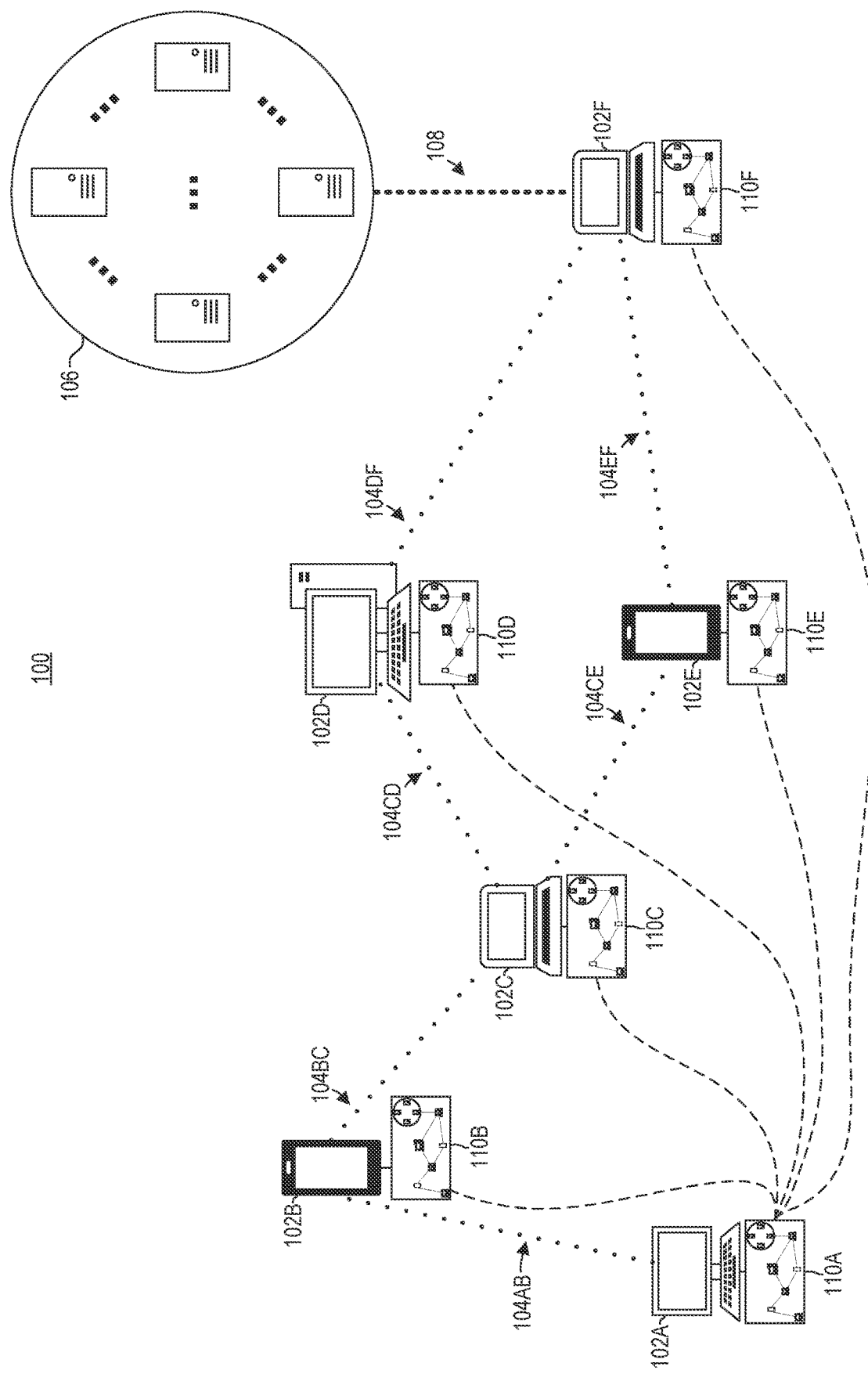

As an example, FIG. 1C illustrates an example of this update process via the dashed lines extending from the dynamic routing table replica 110A to the other dynamic routing table replicas 110B, 110C, 110D, 110E, and 110F within the mesh network 100. Other updates to the dynamic routing table may similarly be recorded by individual nodes of mesh network 100 and communicated to other nodes to facilitate convergence of the different replicas of the dynamic routing table. Examples of other updates include removal of nodes and reconstitution of interconnections between nodes.

The examples provided thus far have been generally focused on utilizing a dynamic routing table implemented as a CRDT to facilitate extension of WAN connectivity within a mesh network of nodes. It will be appreciated, however, how the disclosed principles can also be implemented using substantially static routing tables, which can operate without dynamic updating.

Figure 1D:
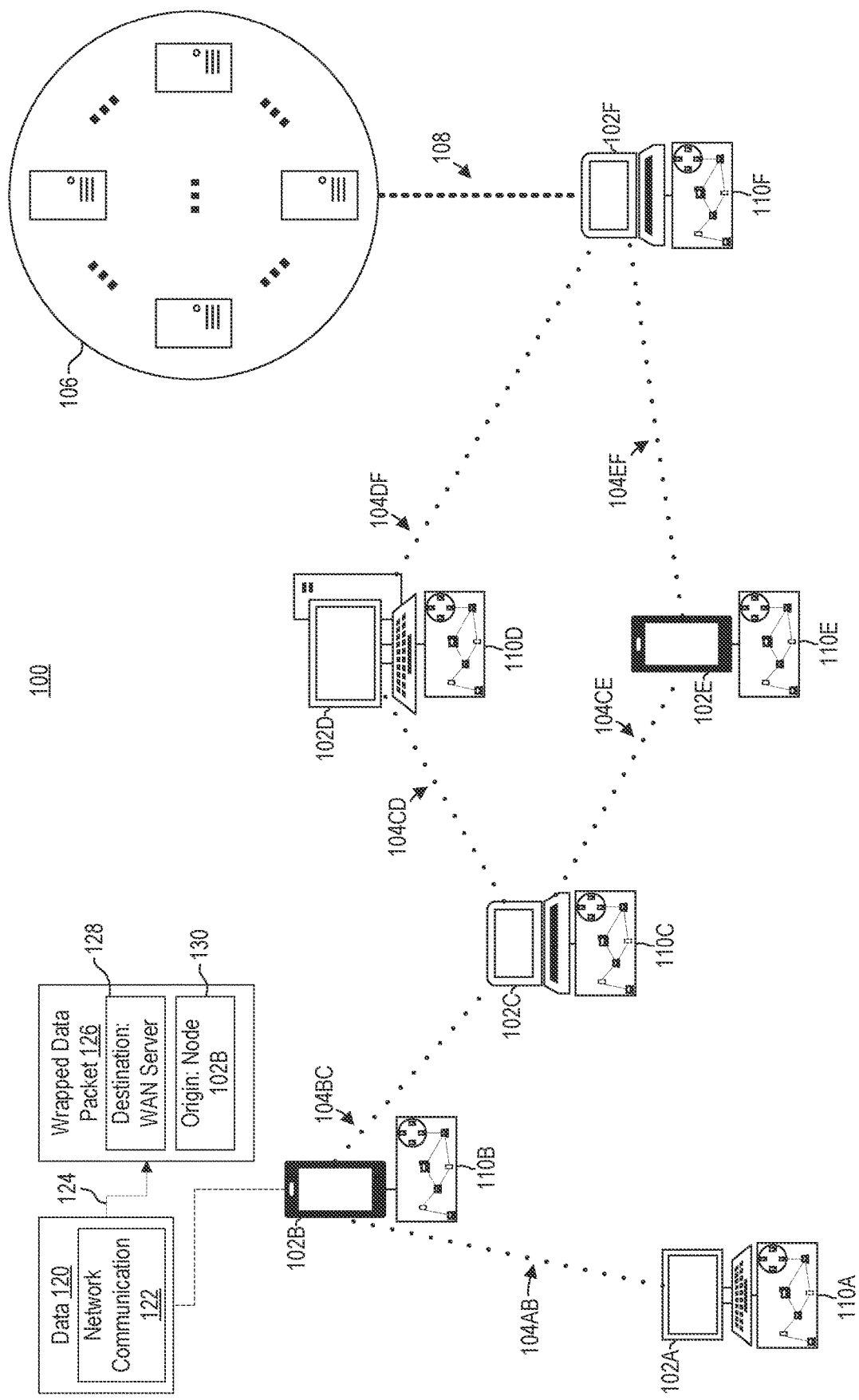
FIG. 1D illustrates a conceptual representation of a node of the mesh network of nodes generating a wrapped data packet based upon a network communication.

The dynamic routing table of mesh network 100 may enable packet transfers within mesh network 100 in a manner that enables extension of WAN connectivity to all nodes within mesh network 100, provided that at least one node is directly connected to a WAN. FIG. 1D illustrates an example in which data 120 at node 102B within mesh network 100 includes a network communication 122. Network communication 122 may comprise an internet protocol (IP) based communication, such as a data packet for delivery to a VPN server to facilitate operation of node 102B as a VPN client. Although node 102B is not directly connected to WAN 106, mesh network 100 may leverage the mesh connections between the nodes to enable network communication 122 to reach a node that is directly connected to WAN 106 to forward network communication 122 to the VPN server.

FIG. 1D shows a scenario that facilitates such routing. In particular, node 102B performs a wrapping operation 124 on data 120 to generate a wrapped data packet 126. The wrapping operation 124 transforms data 120 into a message protocol that is shared by the nodes of mesh network 100 and that is used to facilitate inter-node packet routing.

In FIG. 1D, the wrapped data packet 126 includes a destination indicator 128 and an origin indicator 130. The destination indicator 128 specifies a destination accessible via WAN 106 (e.g., a "WAN Server" such as service 106A of FIG. 1A). The origin indicator 130 specifies the node 102B at which the data 120 and network communication 122 originated.

Figure 1E:
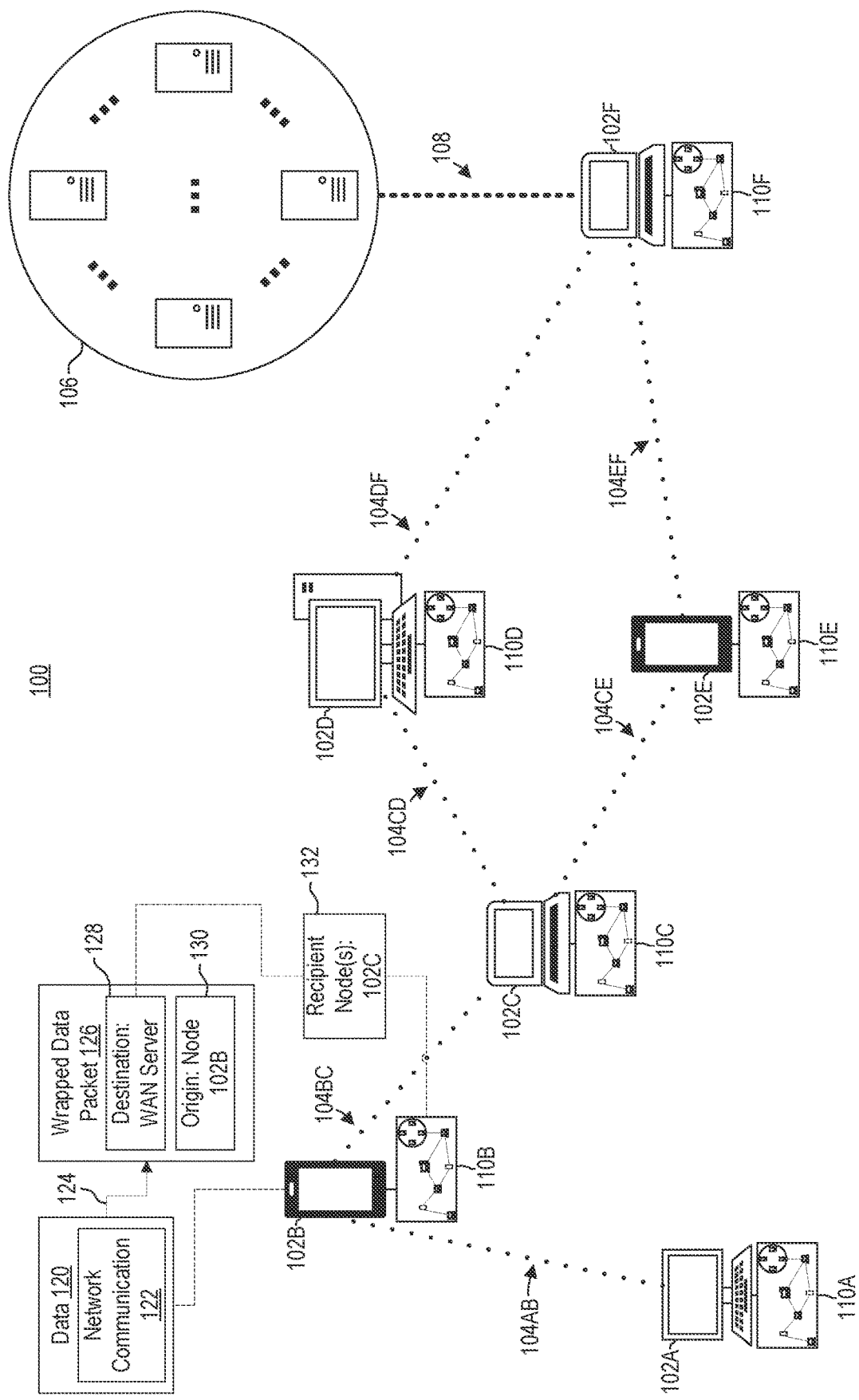
FIGS. 1E, 1F, 1G, 1H, 1I, 1J, and 1K illustrate conceptual representations of routing the wrapped data packet through the mesh network of nodes using the dynamic routing table.

FIGS. 1E through 1K illustrate conceptual representations of routing the wrapped data packet 126 through the mesh network 100 of nodes using the dynamic routing table of the mesh network 100. FIG. 1E depicts a recipient node indicator 132, which specifies the next recipient node(s) for the wrapped data packet 126 to reach the WAN server destination (e.g., service 106A) specified by the destination indicator 128. In FIG. 1E, the recipient node indicator 132 specifies a next hop toward node 102C.

The next recipient node for the wrapped data packet 126 is determined based on the destination indicator 128 and the dynamic routing table (e.g., the dynamic routing table replica 110B of the node 102B). The next recipient node is selected based on various factors, such as path transit time, number of nodes along path, path reliability, types of peer-to-peer connections along path, or others.

The next recipient node is identified as being node 102C, as shown by the recipient node indicator 132. Node 102B sends/transmits the wrapped data packet 126 to the recipient node 102C.

Figure 1F:
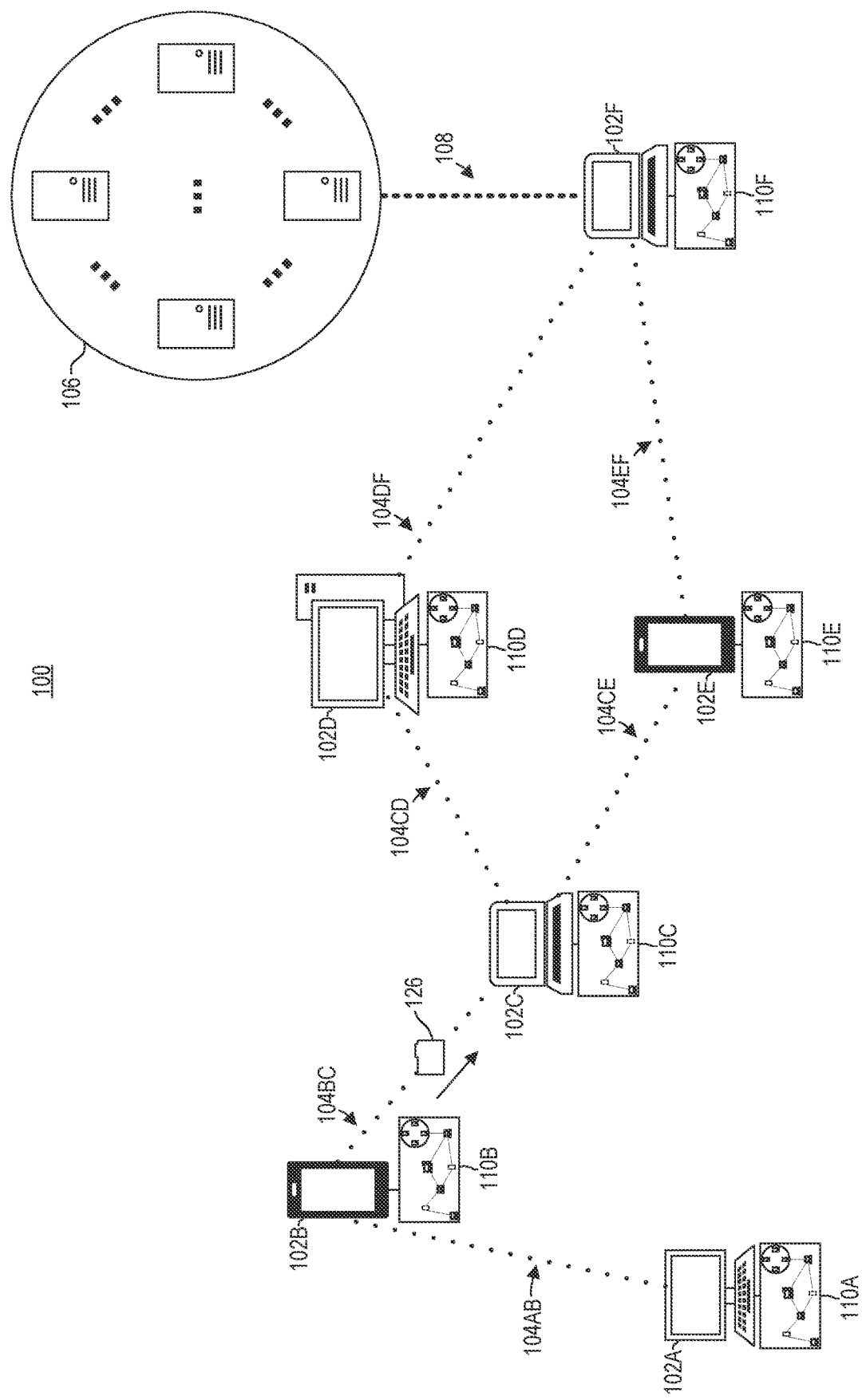

FIG. 1F conceptually depicts the wrapped data packet 126 being transmitted along connection 104BC between node 102B and node 102C. As noted above, connection 104BC may comprise a personal or peer-to-peer connection, such as a peer-to-peer Wi-Fi connection, Bluetooth, or other local connection. As such, sending the wrapped data packet 126 may comprise chunking of the wrapped data packet 126 and/or other processing of the wrapped data packet to facilitate transmission across the point to point link or transport between the nodes 102B and 102C.

Figure 1G:
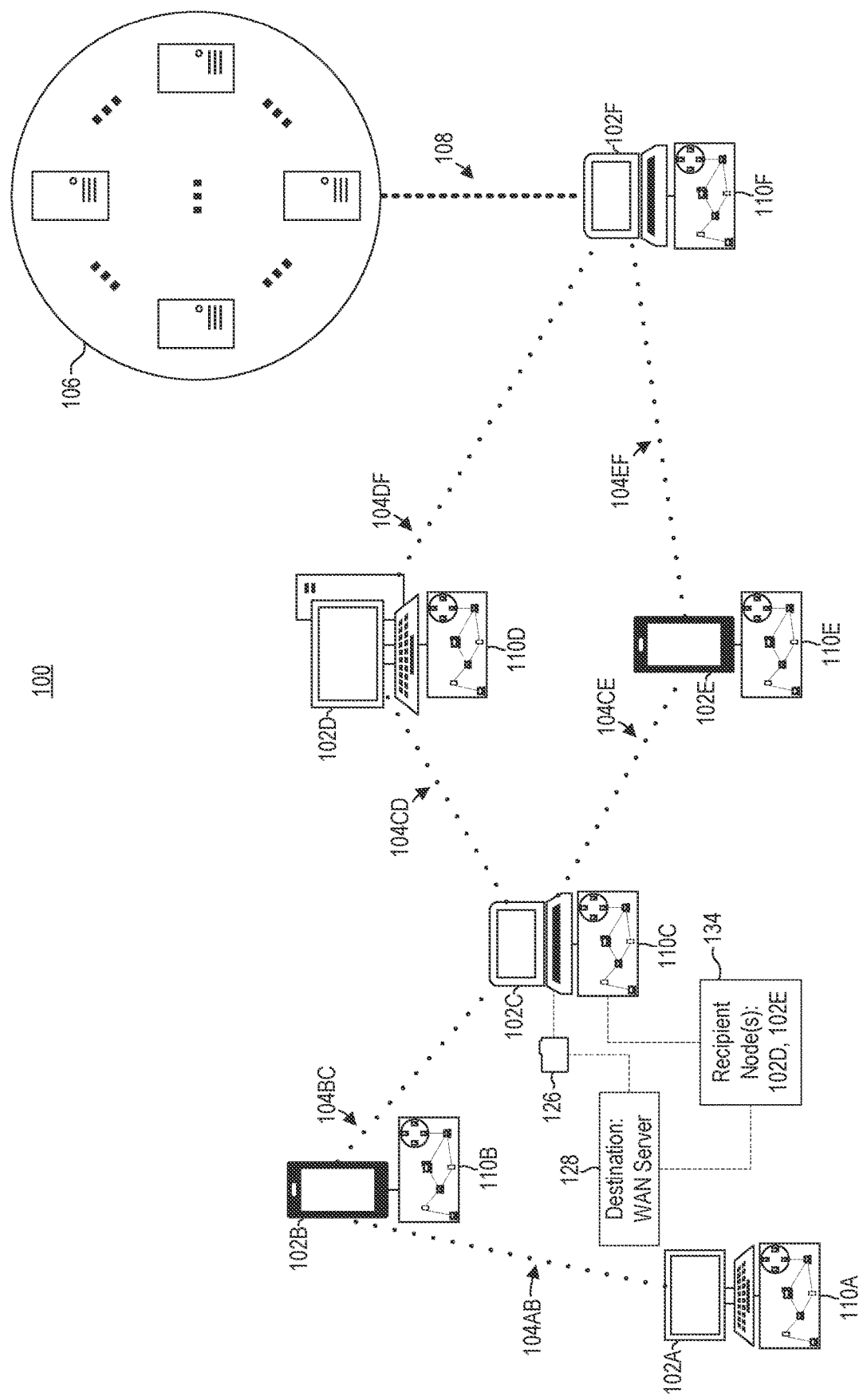

FIG. 1G conceptually depicts reception of the wrapped data packet 126 (generated at node 102B based on data 120 and network communication 122) by node 102C and processing of the wrapped data packet 126 by node 102C. In FIG. 1G, node 102C receives the wrapped data packet 126. Notice, node 102C is not directly connected to WAN 106.

As before, the wrapped data packet 126 includes the destination indicator 128 specifying the WAN server (e.g., service 106A), as indicated in FIG. 1G by the dashed line extending between the destination indicator 128 and the wrapped data packet 126. In FIG. 1G, node 102C determines the next recipient node using recipient node indicator 134, where that determination is based on the destination indicator 128 and the dynamic routing table replica 110C of the node 102C.

In some instances, the origination indicator 130 of the wrapped data packet 126 (see FIG. 1E) also impacts the selection of the next hop for the wrapped data packet 126 from node 102C. For instance, node 102C may access the origination indicator 130 or another indicator of the node(s) through which the wrapped data packet has already been routed and apply logic to avoid sending the wrapped data packet 126 to any nodes that have already received the wrapped data packet 126.

The recipient node indicator 134 of FIG. 1G indicates different paths for routing the wrapped data packet 126 toward WAN 106. Specifically, the recipient node indicator 134 indicates node 102D and node 102E as potential recipient nodes for pushing the wrapped data packet 126 toward its destination. The node paths represented by the recipient node indicator 134 may be associated with different transit times and/or other path characteristics. Node 102C may select an appropriate next hop (e.g., based upon the path characteristics) and send the wrapped data packet 126 accordingly.

Figure 1H:
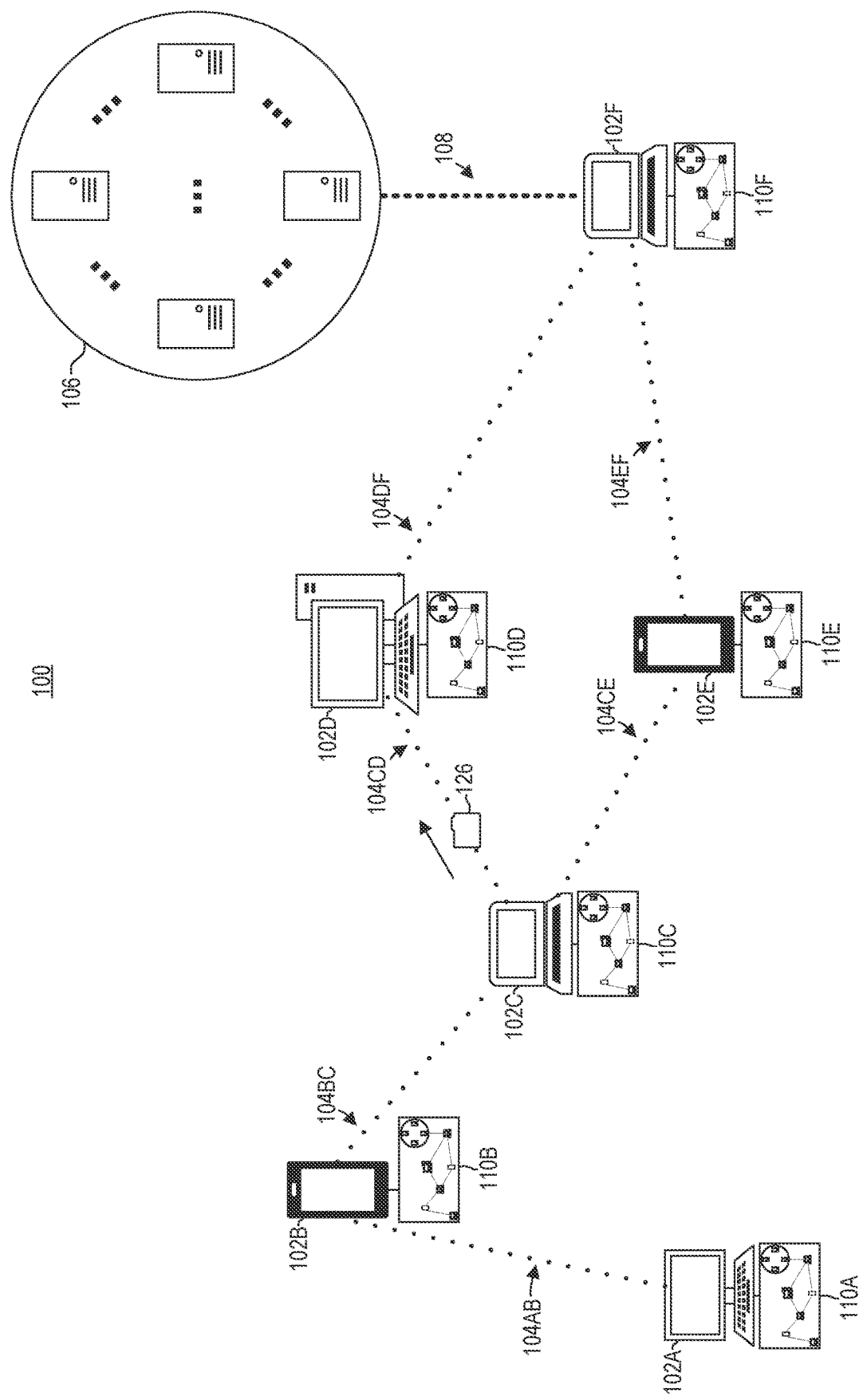

For example, FIG. 1H illustrates an example in which the wrapped data packet 126 is sent from node 102C to node 102D along connection 104CD. This selection is based on a determination that node 102D is the best next recipient node to push the wrapped data packet 126 along the path toward its destination. As noted above, the wrapped data packet 126 may be transmitted using a transport mechanism specific to the type of local connection 104CD between the nodes 102C and 102D.

In some instances, the nodes of the mesh network 100 are configured to communicate acknowledgement of receipt of data packets to one another. This action can be performed utilizing transmission control protocols and/or other mechanisms for communicating complete delivery/transmission/receipt.

For example, after sending the wrapped data packet 126 to node 102D (e.g., as shown in FIG. 1H), node 102C may await acknowledgement of the receipt of the wrapped data packet 126 from node 102D. In some implementations, after failing to receive an acknowledgement of receipt within a predetermined time period, node 102C may send the wrapped data packet 126 to a different recipient node associated with a different path toward the final destination for wrapped data packet 126.

Figure 1I:
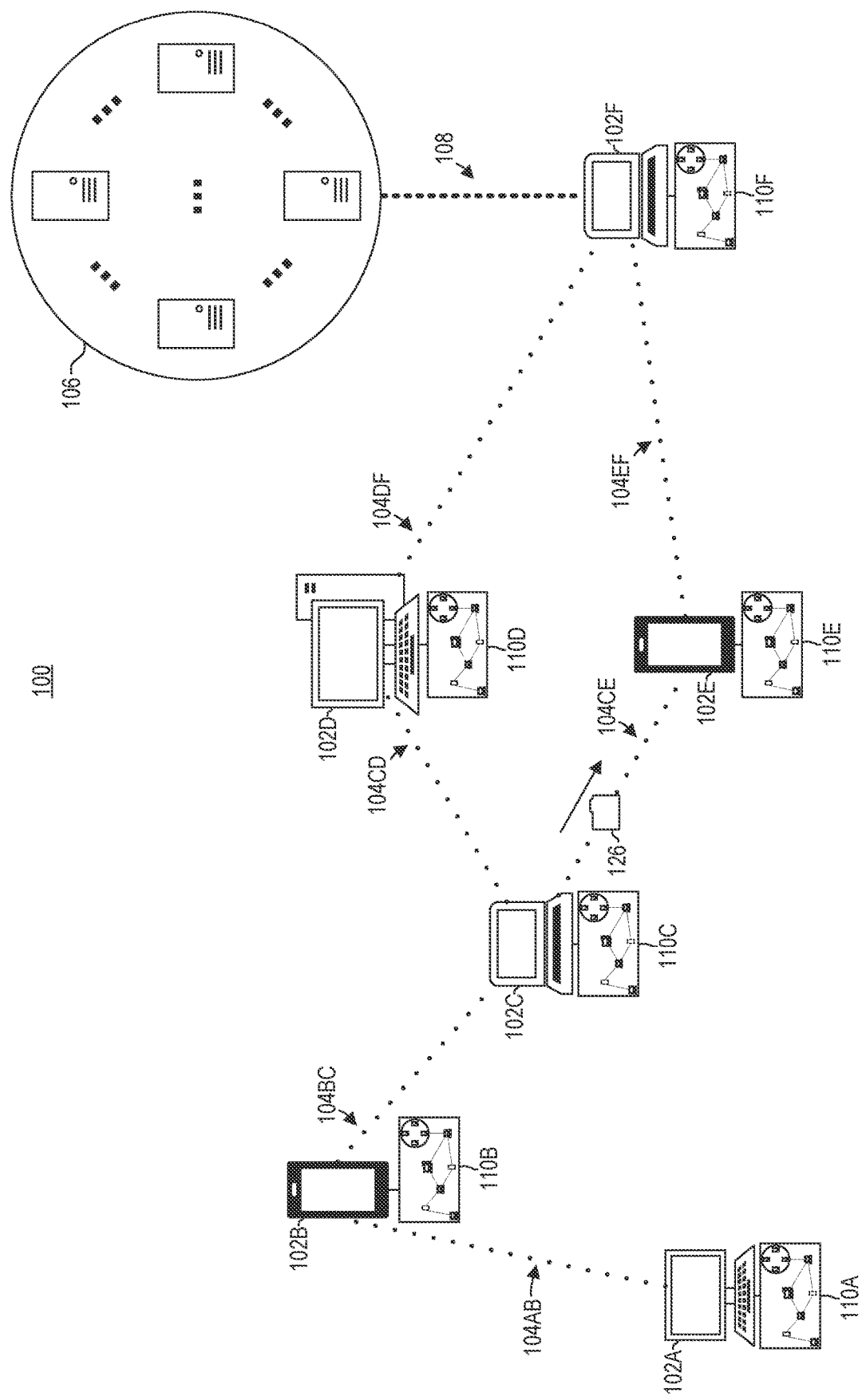

FIG. 1I depicts the wrapped data packet 126 being sent from node 102C to node 102E along the connection 104CE. This transmission occurs as a result of node 102C failing to detect acknowledgement of the receipt of the wrapped data packet by node 102D.

Figure 1J:
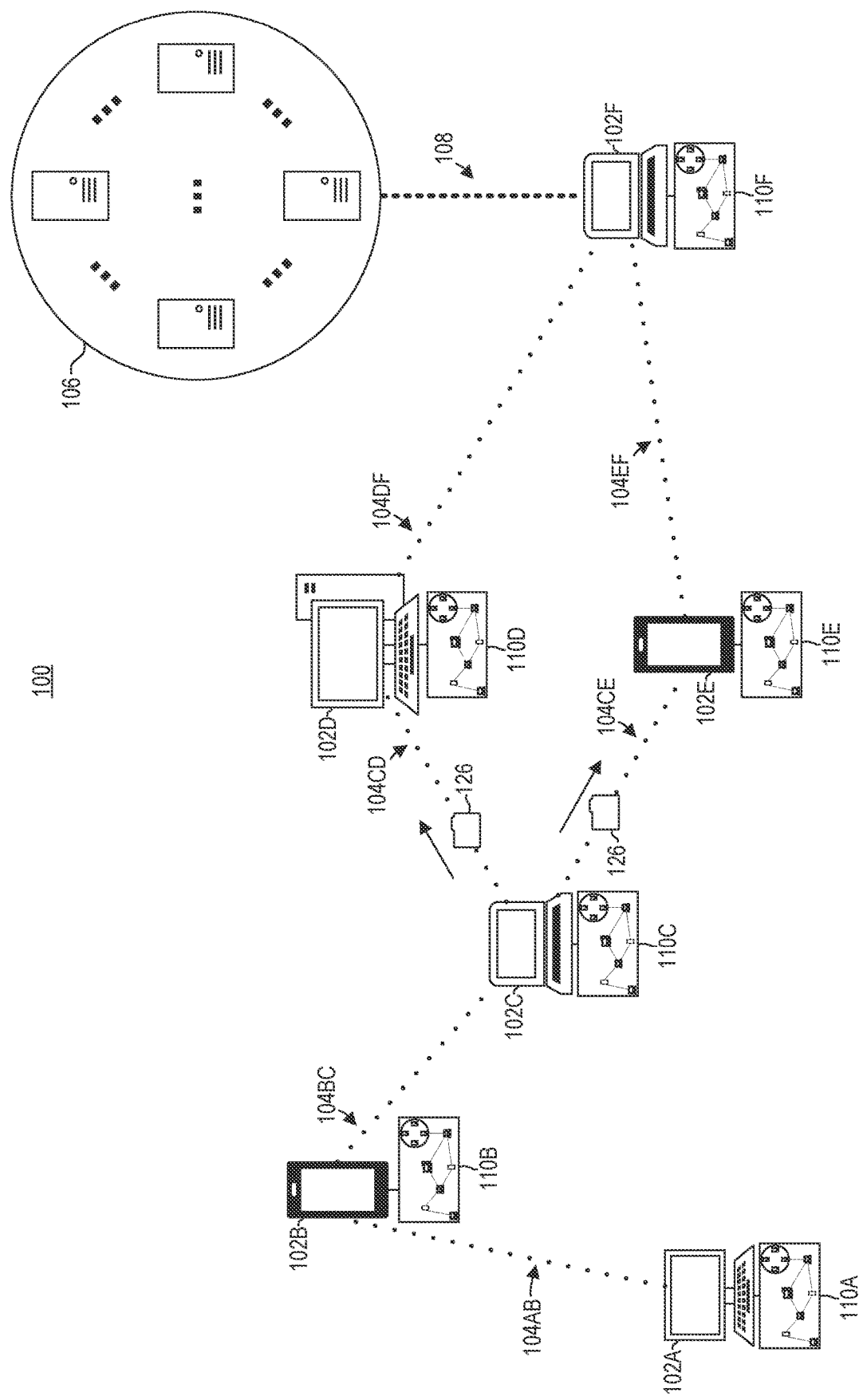

In some implementations, a node redundantly sends the wrapped data packet along multiple paths to multiple recipient nodes. For example, FIG. 1J depicts node 102C redundantly sending the wrapped data packet 126 to nodes 102D and 102E along connections 104CD and 104CE, respectively, to allow the wrapped data packet 126 to progress toward its destination along multiple paths. Doing so reduces the likelihood of transmission failure.

Additionally, or alternatively, nodes may employ probabilistic mechanisms to facilitate packet routing amongst the mesh network 100. Examples of these probabilistic mechanisms include forward error correction, fountain code, or other network coding techniques.

Figure 1K:
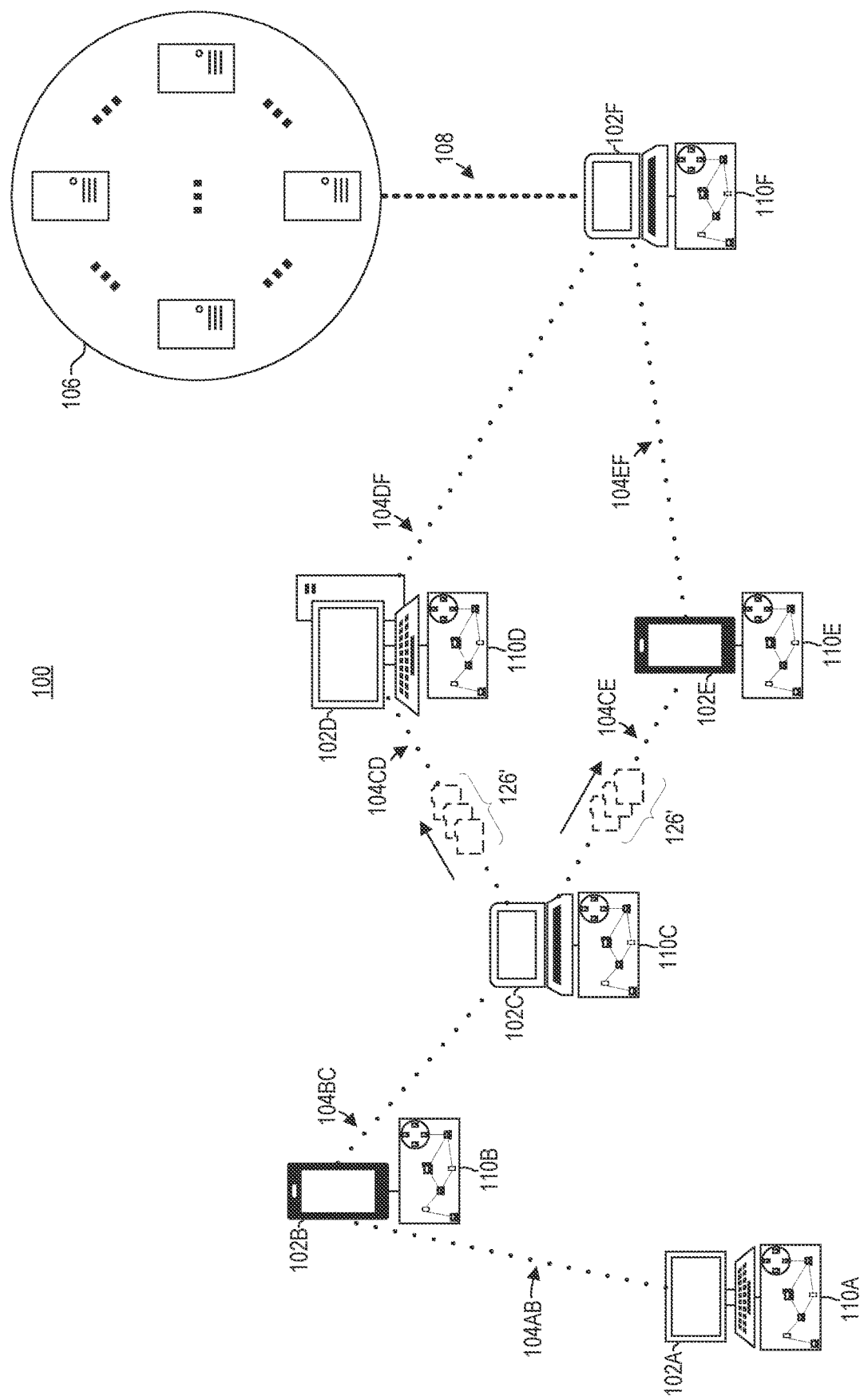

FIG. 1K shows a scenario where node 102C encodes the wrapped data packet 126 into a set of encoded wrapped data packets 126'. Node 102C then sends the encoded wrapped data packets 126' to multiple recipient nodes along multiple paths. After reaching a destination node, the encoded wrapped data packets 126' are then used to reconstruct the wrapped data packet 126 for further processing. Such techniques can facilitate improved bandwidth transmission or transmission reliability. These techniques also beneficially account for errors that might arise from temporary discrepancies that exist between the dynamic routing table replicas maintained at the various nodes.

Figure 1L:
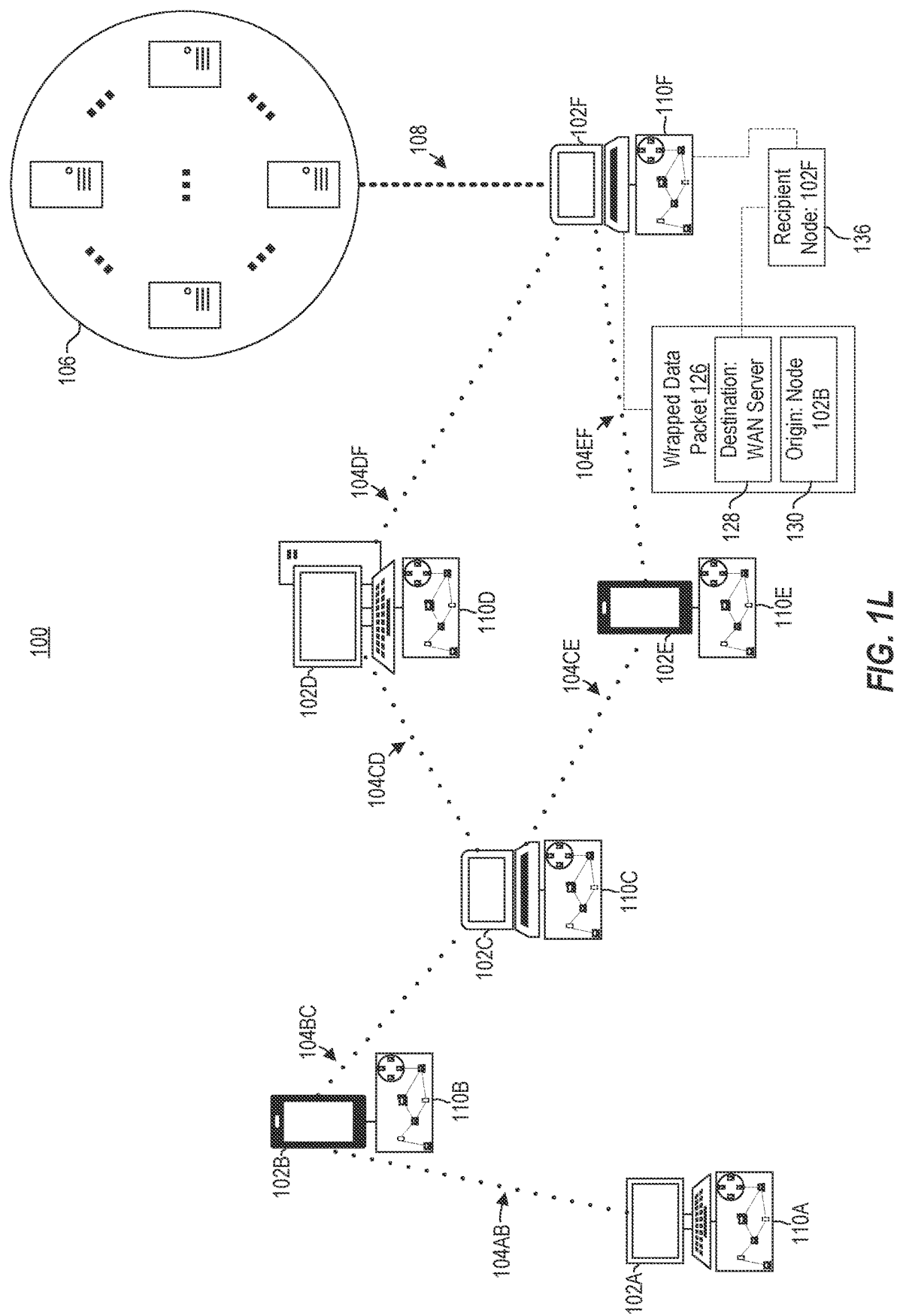
FIGS. 1L, 1M, and 1N illustrate a conceptual representation of a node of the mesh network of nodes unwrapping the wrapped data packet and processing the network communication.

The nodes can utilize the above techniques to route the wrapped data packet 126 toward a node that has a direct connection to WAN 106. FIG. 1L illustrates the wrapped data packet 126 being received at node 102F.

FIG. 1L depicts node 102F determining that the final recipient node for the wrapped data packet 126 is itself, as represented in the recipient node indicator 136. After making this determination, node 102F may then perform various processes on the wrapped data packet 126 as opposed to further routing the wrapped data packet to another node of the mesh network 100.

Figure 1M:
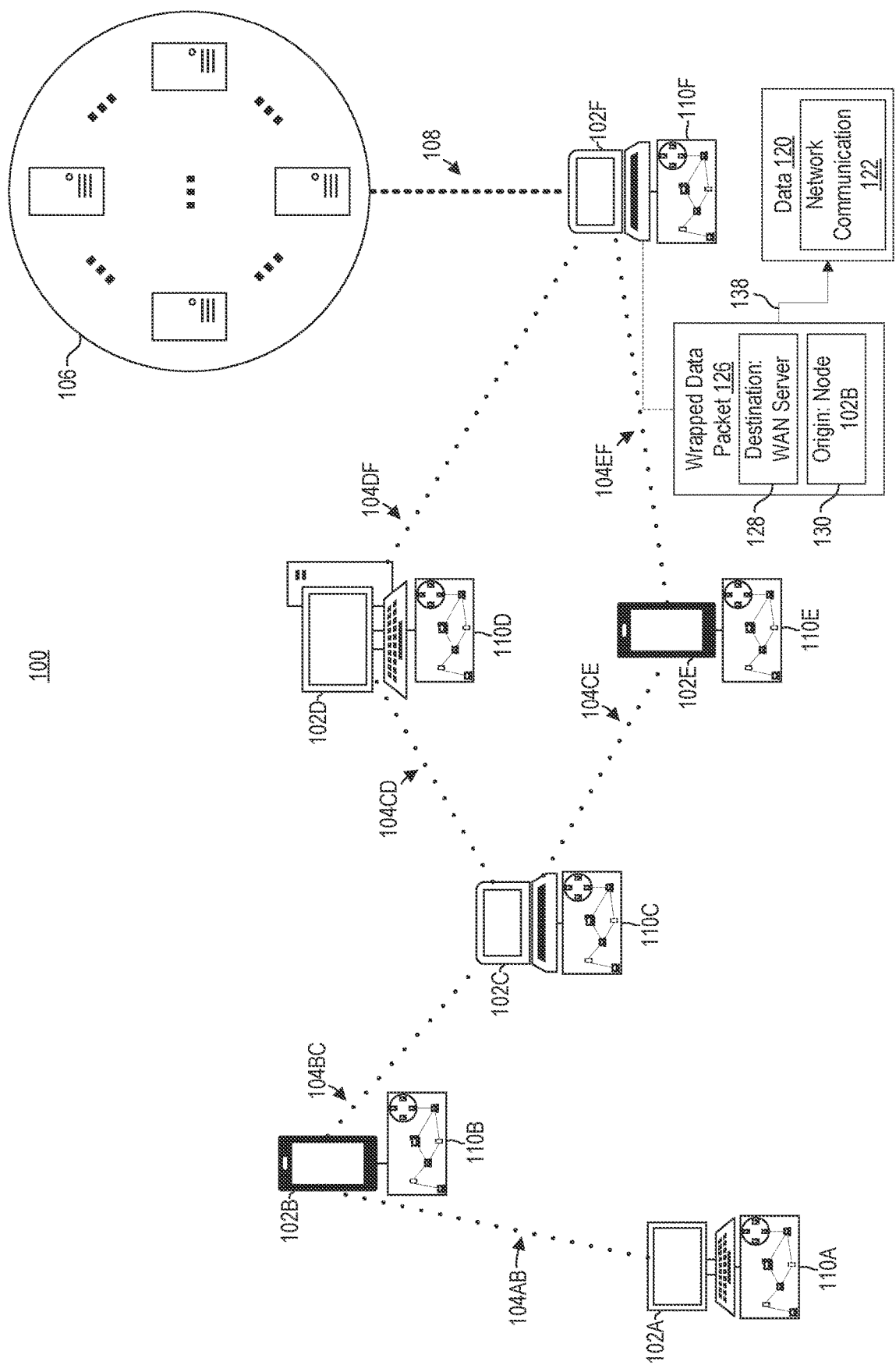

For instance, FIG. 1M illustrates a scenario involving an unwrapping operation 138 performed on the wrapped data packet 126. This operation is performed to obtain data 120 and network communication 122. The unwrapping operation 138 may be performed in accordance with the message protocol for the nodes of the mesh network discussed earlier.

Figure 1N:
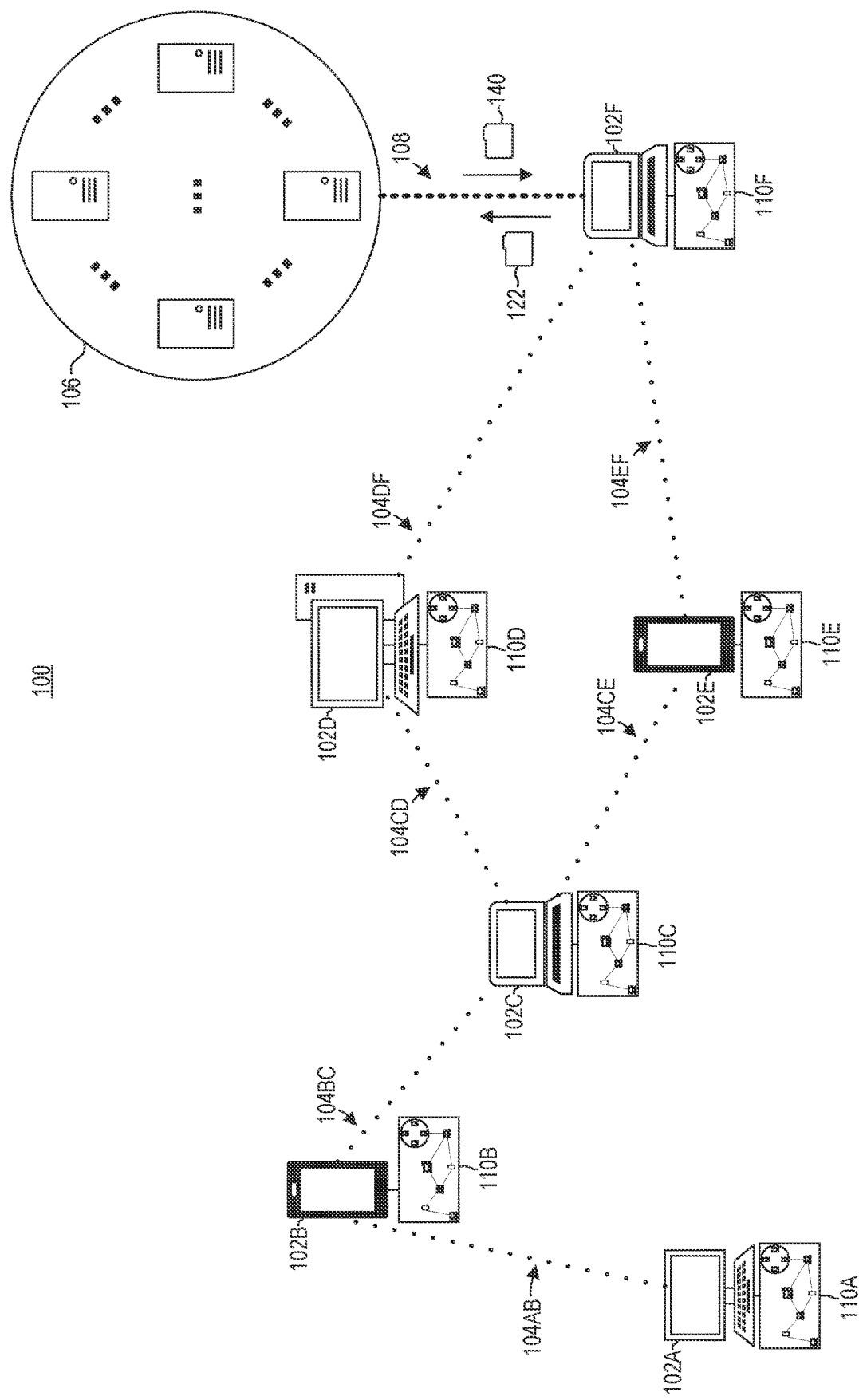

The node 102F is then able to process data 120 or network communication 122. For instance, FIG. 1N illustrates a scenario where node 102F transmits the network communication 122 over the direct WAN connection 108 to WAN 106. Such an operation is performed to facilitate further routing of the network communication 122 within WAN 106 to reach a WAN server that is indicated by the destination indicator associated with the network communication 122. In some instances, such as where the destination for the network communication 122 is a node of the mesh network 100, the processing of a network communication 122 includes presenting the network communication 122, or information based thereon, at the node 102F.

The principles discussed herein may be utilized to facilitate transport of network communications from WAN-connected servers or other WAN-connected devices to nodes of mesh network 100, even for nodes that do not have a direct WAN connection. FIG. 1N illustrates a network communication 140 transmitted across the direct WAN connection 108 from the WAN 106 to node 102F of the mesh network 100. The network communication 140 may for example, be an IP packet sent by a WAN-connected server in response to the network communication 122 that originated at node 102B of the mesh network 100. Node 102F may perform a wrapping operation (e.g., similar to wrapping operation 124) on the network communication 140 to generate a wrapped data packet adapted for node-to-node routing within the mesh network 100.

The wrapped data packet may then be routed through the nodes of mesh network 100 to a destination address, such as, perhaps, the address of node 102B. Node 102B may then perform an unwrapping operation (e.g., similar to unwrapping operation 138) on the wrapped data packet to obtain the network communication 140. Such operations may be performed even though the destination node does not have a direct WAN connection. Node 102B may then process the network communication 140 by presenting information based on network communication 140 at a user interface associated with node 102B.

The examples discussed herein have generally focused on (i) utilizing a dynamic routing table to facilitate routing of network communications among nodes of a mesh network to reach a WAN-connected node for transmitting the network communication over the WAN and (ii) utilizing a dynamic routing table to facilitate routing of network communications from a WAN-connected node (e.g., received by the WAN-connected node from a WAN server) to other nodes of a mesh network. It will be appreciated, however, how the disclosed principles may be utilized in other contexts, such as to facilitate inter-node communications without transmitting the communications to a WAN.

In view of the foregoing, nodes of mesh network 100 may be configured to perform numerous functions, such as (i) generating wrapped data packets by performing wrapping operations on network communications (e.g., network communications generated at the node or received over a direct WAN connection); (ii) receiving wrapped data packets from other nodes; (iii) sending wrapped data packets to other nodes whether the wrapped data packet is generated at the node or received from another node; (iv) obtaining data communications by performing unwrapping operations on received wrapped data packets; and (v) processing network communications (e.g., by transmitting the network communication to a WAN, compiling the network communication to present information at a user interface, etc.).

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
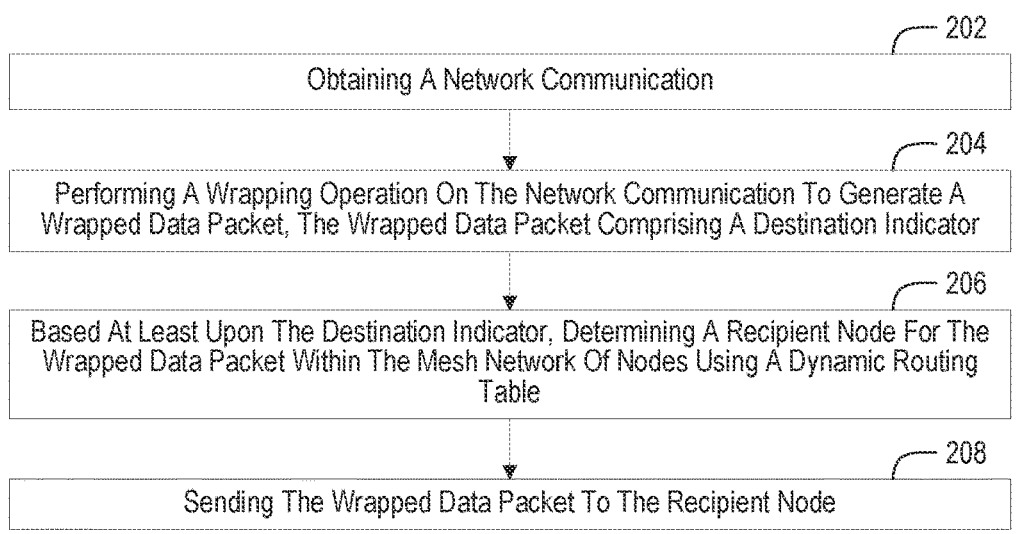
Figure 3:
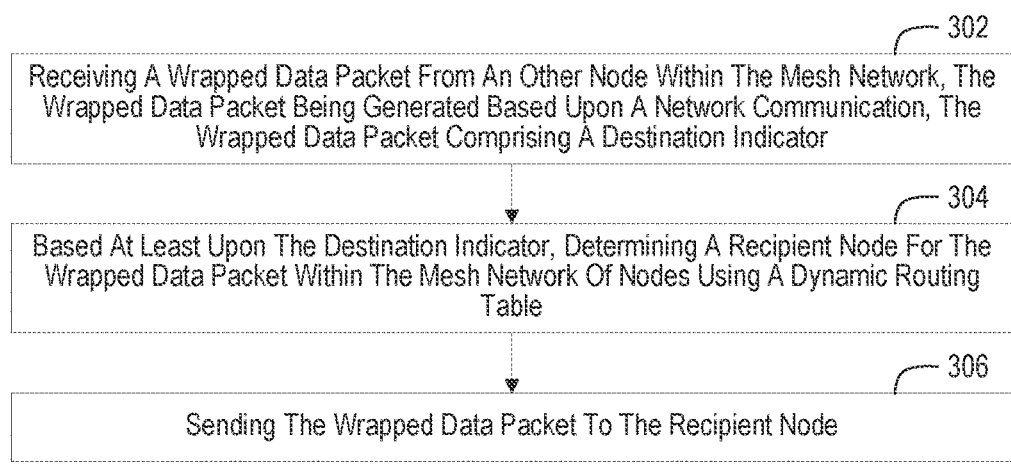

FIGS. 2, 3, and 4 illustrate example flow diagrams of methods 200, 300, and 400, respectfully, depicting method acts associated with mesh network routing via dynamic routing tables. Mesh network 100 can be used to implement methods 200, 300, and 400. In particular, the acts depicted in method 200 of FIG. 2 may be performed at a first node of a mesh network of nodes (e.g., by execution of computer-executable instructions). The nodes of the mesh network may be interconnected via peer-to-peer connections, and at least one node of the mesh network may be directly connected to a WAN. The nodes provide an edge synchronization platform.

Method 200 includes an act (act 202) of obtaining a network communication. The network communication may comprise an internet protocol based communication.

Act 204 includes performing a wrapping operation on the network communication to generate a wrapped data packet. Here, the wrapped data packet includes a destination indicator. In some implementations, the destination indicator indicates a WAN destination or a node of the mesh network of nodes that is directly connected to a WAN.

Act 206 includes determining, based at least on the destination indicator, a recipient node (e.g., a second node)

for the wrapped data packet. This recipient node exists within the mesh network of nodes. The process of identifying this recipient node is performed using a dynamic routing table.

The dynamic routing table may include a CRDT. In some instances, each node within the mesh network maintains a respective replica of the dynamic routing table. In some implementations, determining the recipient node using the dynamic routing table comprises accessing a respective replica of the dynamic routing table maintained by the first node to determine the recipient node.

Act 208 includes sending the wrapped data packet to the recipient node. In some implementations, the first node is further configured to: (i) perform unwrapping operations on wrapped data packets to facilitate processing of network communications by the first node; and (ii) receive other wrapped data packets from other nodes of the mesh network of nodes and pass the other wrapped data packets to other recipient nodes, with the other recipient nodes being identified using the dynamic routing table. That identification process can also be based on other destination indicators associated with the other wrapped data packets.

FIG. 3 shows another flowchart of an example method 300 for transmitting information through a mesh network. The acts depicted in method 300 can also be performed at a first node of a mesh network of nodes. As before, the nodes of the mesh network of nodes may be interconnected via peer-to-peer connections. Also, at least one of these nodes is directly connected to a WAN.

Act 302 of method 300 includes receiving a wrapped data packet from another node within the mesh network. The wrapped data packet is generated based on a network communication. Also, the wrapped data packet includes a destination indicator. In some instances, the network communication includes an internet protocol based communication.

Act 304 includes determining, based on the destination indicator, a recipient node for the wrapped data packet. This determination is based on using a dynamic routing table. In some instances, the dynamic routing table includes a CRDT. Optionally, each node in the mesh network can maintain a respective replica of the dynamic routing table. In some implementations, the process of determining the recipient node using the dynamic routing table includes accessing a respective replica of the dynamic routing table maintained by the first node to determine the recipient node. In some instances, the wrapped data packet includes an origination indicator or a sender indicator. The determination of the recipient node using the dynamic routing table may be based on the origination indicator or the sender indicator.

Act 306 includes sending the wrapped data packet to the recipient node. In some instances, sending the wrapped data packet to the recipient node utilizes a peer-to-peer connection between the first node and the recipient node. In some implementations, in response to failing to detect acknowledgement of receipt of the wrapped data packet by the recipient node, the first node sends the wrapped data packet to a second recipient node of the mesh network of nodes, with the second recipient node being determined using the dynamic routing table.

In some implementations, the first node redundantly sends the wrapped data packet to a second recipient node of the mesh network of nodes, with the second recipient node being determined using the dynamic routing table. In some implementations, sending the wrapped data packet to the recipient node comprises (i) generating a plurality of encoded wrapped data packets based on the wrapped data packet and (ii) sending the plurality of encoded wrapped data packets to a set of recipient nodes that includes the recipient node.

In some implementations, the first node (or any other node) is further configured to: (i) perform unwrapping operations on wrapped data packets to facilitate processing of network communications by the first node and (ii) generate other wrapped data packets by performing wrapping operations on other network communications and pass the other wrapped data packets to other recipient nodes of the mesh network of nodes. These other recipient nodes can be identified using the dynamic routing table. These other recipient nodes can also be identified based on other destination indicators associated with the other wrapped data packets.

The acts depicted in method 400 of FIG. 4 may be performed at a first node of a mesh network of nodes. The nodes of the mesh network may be interconnected via peer-to-peer connections. At least the first node may be directly connected to a WAN.

Act 402 includes receiving a wrapped data packet from another node within the mesh network. The wrapped data packet is generated based on a network communication. The wrapped data packet includes a destination indicator.

Act 404 includes determining, based at least on the destination indicator, a recipient node for the wrapped data packet within the mesh network. This determination is performed using a dynamic routing table. In some implementations, the dynamic routing table comprises a CRDT. Optionally, each node in the mesh network can maintain a respective replica of the dynamic routing table.

Act 406 includes performing, in response to determining that the recipient node comprises the first node, an unwrapping operation. This unwrapping operation is performed to facilitate processing of the network communication. In some implementations, the network communication comprises an internet protocol based communication. The first node can process the network communication by transmitting the network communication to the WAN. In some instances, the first node may process the network communication by interpreting the network communication for presentation at a user interface associated with the first node.

In some implementations, the first node is further configured to receive wrapped data packets from other nodes of the mesh network of nodes and pass the wrapped data packets to recipient nodes of the mesh network of nodes. The recipient nodes can be identified using the dynamic routing table and can be identified based on destination indicators associated with the wrapped data packets. The first node may be further configured to generate other wrapped data packets by performing wrapping operations on other network communications. The node can then pass the other wrapped data packets to other recipient nodes of the mesh network. These other recipient nodes may be identified using the dynamic routing table and may be identified based on other destination indicators associated with the other wrapped data packets.

Additional Details Related to Implementing the Disclosed Embodiments

Figure 5:
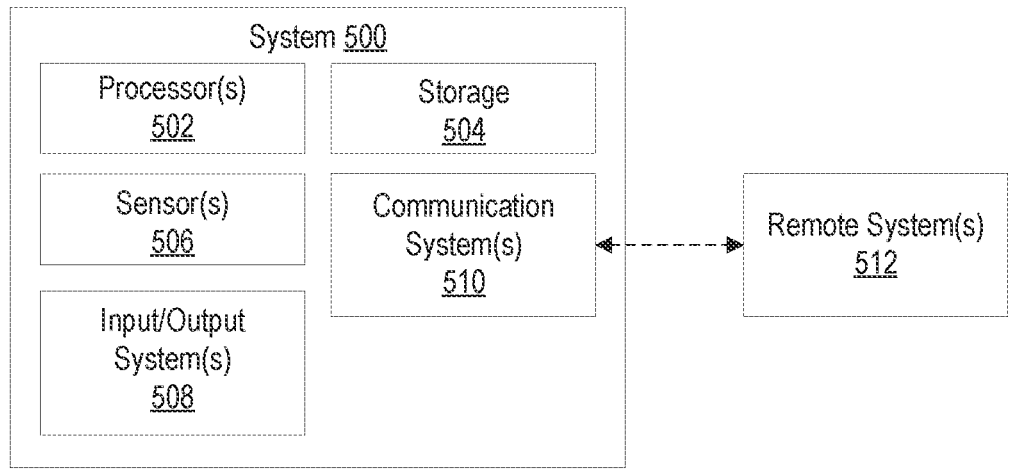
FIG. 5 depicts example components of a system that may comprise or be configurable to perform various embodiments.

FIG. 5 illustrates example components of a system 500 that may comprise or implement aspects of one or more disclosed embodiments. For example, FIG. 5 illustrates an implementation in which the system 500 includes processor(s) 502, storage 504, sensor(s) 506, I/O system(s) 508, and communication system(s) 510. Although FIG. 5 illustrates a system 500 as including particular components, one will appreciate, in view of the present disclosure, that a system 500 may comprise any number of additional or alternative components.

The processor(s) 502 may comprise one or more sets of electronic circuitries that include any number of logic units, registers, or control units to facilitate the execution of computer-readable instructions. Such computer-readable instructions may be stored within storage 504. The storage 504 may comprise physical system memory and may be volatile, non-volatile, or some combination thereof. Furthermore, storage 504 may comprise local storage, remote storage (e.g., accessible via communication system(s) 510 or otherwise), or some combination thereof. Additional details related to processors (e.g., processor(s) 502) and computer storage media (e.g., storage 504) will be provided hereinafter.

The processor(s) 502 may be configured to execute instructions stored within storage 504 to perform certain actions. In some instances, the actions may rely at least in part on communication system(s) 510 for receiving data from remote system(s) 512, which may include, for example, separate systems or computing devices, sensors, and the like. The communications system(s) 510 may comprise any combination of software or hardware components that are operable to facilitate communication between on-system components or with off-system components. For example, the communications system(s) 510 may comprise ports, buses, or other physical connection apparatuses for communicating with other components. Additionally, or alternatively, the communications system(s) 510 may comprise systems operable to communicate wirelessly with external systems or devices through any suitable communication channel(s), such as, by way of non-limiting example, Bluetooth, ultra-wideband, WLAN, infrared communication, and the like.

FIG. 5 illustrates that a system 500 may comprise or be in communication with sensor(s) 506. Sensor(s) 506 may comprise any device for capturing or measuring data representative of perceivable phenomenon. By way of non-limiting example, the sensor(s) 506 may comprise one or more image sensors, microphones, thermometers, barometers, magnetometers, accelerometers, gyroscopes, or others.

Furthermore, FIG. 5 illustrates that a system 500 may comprise or be in communication with I/O system(s) 508. I/O system(s) 508 may include any type of input or output device such as, by way of non-limiting example, a display, a touch screen, a mouse, a keyboard, a controller, or others, without limitation.

Disclosed embodiments may comprise or utilize a special purpose or general-purpose computer including computer hardware, as discussed in greater detail below. Disclosed embodiments also include physical and other computer-readable media for carrying or storing computer-executable instructions or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives (SSD) that are based on RAM, Flash memory, phase-change memory (PCM), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmission media can include a network or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), or others.

As used herein, the terms "executable module," "executable component," "component," "module," "service," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system that operates in a local mesh network of nodes, said system comprising:
   one or more processors; and
   one or more hardware storage devices that store instructions that are executable by the one or more processors to cause the system to:
   receive or generate a network communication that is destined for a wide area network (WAN) but that is not directly deliverable to the WAN as a result of the system having no direct WAN connection, the system being an edge node in the local mesh network of nodes wherein a recipient node of the local mesh network of nodes has a direct WAN connection;
   wrap the network communication to generate a wrapped data packet comprising a destination indicator, wherein the wrapped data packet is structured for transmittal through a serial chain of one or more short-range communication connections of the local mesh network of nodes for delivery to the WAN;
   determine, based on the destination indicator, the recipient node for the wrapped data packet, wherein determining the recipient node includes accessing a replica of a dynamic routing table that is maintained by an alternative node that is included in the local mesh network of nodes and that is not directly connected to the WAN, wherein the alternative node is different than the recipient node such that the alternative node, not the recipient node connected to the WAN, maintains the dynamic routing table; and
   send the wrapped data packet to the recipient node.

2. The system of claim 1, wherein the network communication comprises an internet protocol based communication.

3. The system of claim 1, wherein the one or more short-range communication connections include a Bluetooth connection.

4. The system of claim 1, wherein the system unwraps a different wrapped data packet that is received by the system.

5. A node in a local mesh network of nodes, said node comprising:
   one or more processors; and
   one or more hardware storage devices that store instructions that are executable by the one or more processors to cause the node to:
   receive a wrapped data packet from an edge node included in the local mesh network of nodes, the wrapped data packet being generated based on a network communication that is destined for a wide area network (WAN) but that was not originally directly deliverable to the WAN as a result of the edge node that generated the network communication having no WAN connection, and wherein the wrapped data packet is structured for transmittal through a serial chain of one or more short-range communication connections of the local mesh network of nodes for delivery to the WAN;
   determine a recipient node for the wrapped data packet, wherein the recipient node is also included in the local mesh network of nodes, and wherein determining the recipient node includes accessing a replica of a dynamic routing table that is maintained by an alternative node that is included in the local mesh network of nodes and that is not directly connected to the WAN, wherein the alternative node is different than the recipient node such that the alternative node, not the recipient node connected to the WAN, maintains the dynamic routing table; and
   send the wrapped data packet to the recipient node.

6. The node of claim 5, wherein a dynamic routing table of the node includes a conflict-free replicated data type.

7. The node of claim 5, wherein:
   a second node of the local mesh network of nodes is directly connected to the WAN, and
   a destination indicator of the wrapped data packet indicates either a WAN destination or the second node.

8. The node of claim 5, wherein the wrapped data packet further comprises an origination indicator or a sender indicator.

9. The node of claim 5, wherein sending the wrapped data packet to the recipient node is performed using a peer-to-peer connection that exists between said node and the recipient node.

10. The node of claim 5, wherein the node is further caused to:
    in response to failing to detect acknowledgement of receipt of the wrapped data packet by the recipient node, send the wrapped data packet to a second recipient node of the mesh network of nodes.

11. The node of claim 5, wherein the node is further caused to:
   redundantly send the wrapped data packet to a second recipient node of the local mesh network of nodes.

12. The node of claim 5, wherein sending the wrapped data packet to the recipient node comprises:
   generating a plurality of encoded wrapped data packets, said generation being based on the wrapped data packet; and
   sending the plurality of encoded wrapped data packets to a set of recipient nodes, which includes the recipient node.

13. The node of claim 5, wherein the node is further caused to:
   perform unwrapping operations on wrapped data packets to facilitate processing of network communications by said node.

14. A method performed by a system, said method comprising:
   receiving or generating a network communication that is destined for a wide area network (WAN) but that is not directly deliverable to the WAN as a result of the system having no direct WAN connection, the system being an edge node in a local mesh network of nodes wherein a recipient node of the local mesh network of nodes has a direct WAN connection;
   wrapping the network communication to generate a wrapped data packet, wherein the wrapped data packet is structured for transmittal through a serial chain of one or more short-range communication connections of the local mesh network of nodes for delivery to the WAN;
   determining the recipient node for the wrapped data packet, wherein determining the recipient node includes accessing a replica of a dynamic routing table that is maintained by an alternative node that is included in the local mesh network of nodes and that is not directly connected to the WAN, wherein the alternative node is different than the recipient node such that the alternative node, not the recipient node connected to the WAN, maintains the dynamic routing table; and
   sending the wrapped data packet to the recipient node.

15. The method of claim 14, wherein the network communication comprises an internet protocol based communication.

16. The method of claim 14, wherein the short-range communication connections include a Bluetooth connection.

17. The method of claim 14, the method further includes unwrapping a received wrapped data packet.

18. The method of claim 14, wherein the method further includes:
   receiving wrapped data packets from other nodes of the local mesh network of nodes;
   passing the wrapped data packets to recipient nodes of the local mesh network of nodes;
   generating other wrapped data packets by performing wrapping operations on other network communications; and
   passing the other wrapped data packets to other recipient nodes of the local mesh network of nodes.

* * * * *